No. 782,950. PATENTED FEB. 21, 1905.
L. DION.
FILTER AND CLEANER THEREFOR.
APPLICATION FILED JUNE 10, 1904.
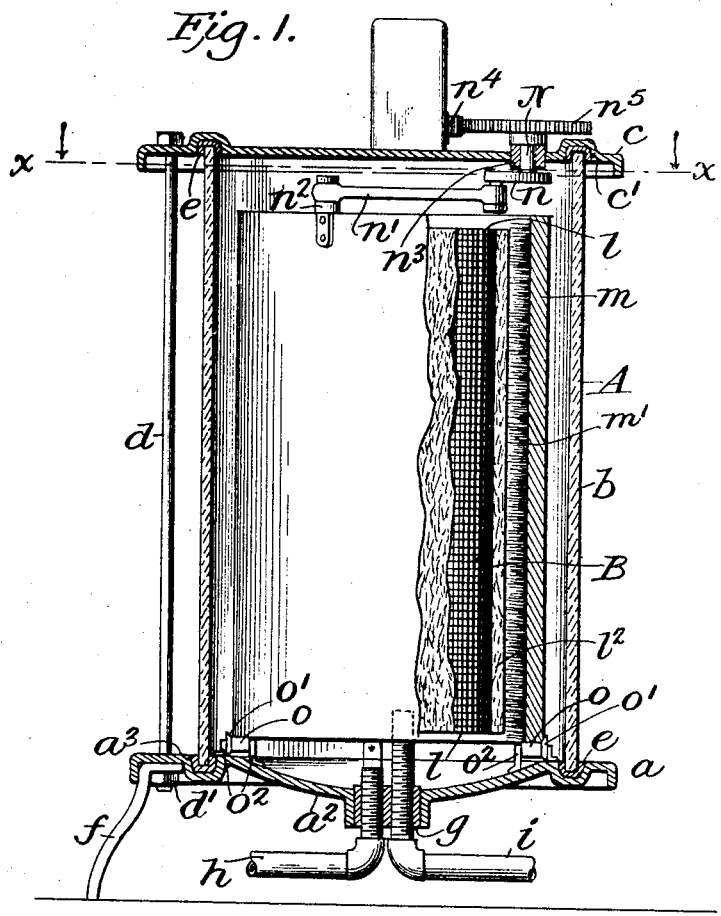
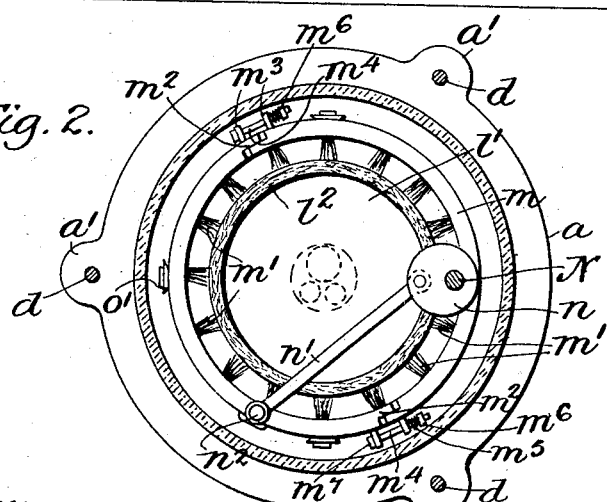
Witnesses
N. G. Douglas
F. D. Ousey
Inventor
Léon Dion
By his Attorney No. 782,950. Patented February 21, 1905.

UNITED STATES PATENT OFFICE.

LÉON DION, OF NEW YORK, N. Y., ASSIGNOR TO THE AMERICUS ELECTRO-HERMATIC COMPANY, OF NEW YORK, N. Y., A CORPORATION OF ARIZONA TERRITORY.

FILTER AND CLEANER THEREFOR.

SPECIFICATION forming part of Letters Patent No. 782,950, dated February 21, 1905.

Application filed June 10, 1904. Serial No. 212,039.

*To all whom it may concern:*

Be it known that I, LÉON DION, a citizen of the United States, and a resident of the borough of Manhattan, in the city, county, and State of New York, have invented certain new and useful Improvements in Filters and Cleaners Therefor, of which the following is a specification.

In an application for Letters Patent filed by me in the United States Patent Office June 3, 1904, and serially numbered 210,982, I have shown a filter and cleaner therefor in which a cylindrical filter is arranged on a vertical axis within a cylindrical chamber composed of a cylindrical body portion clamped between a top plate and a base-plate, with a vertically-reciprocating annular brush applied to and surrounding the filter whereby to clean the latter. My present invention while capable of application to cylindrical and other forms of filter generally is designed more especially as an improvement upon that shown in the application aforesaid; and it has for its object to provide a filter and a cleaning device therefor which while simple in construction and efficient in operation shall at the same time permit of the foreign substances removed from the filter-surface by the cleaning devices falling downward into the bottom of the filter-chamber without obstruction.

To these ends the invention consists in the peculiarities of construction of the cleaning devices and in the means by which they are mounted and operated within the filter-chamber, all as will hereinafter appear.

Referring to the accompanying drawings, which form a part of this specification, Figure 1 is a side elevation, partly in vertical section, of a filter and cleaner constructed in accordance with my invention; and Fig. 2 a transverse horizontal section thereof, taken in the plane $x\,x$ of Fig. 1 and looking downward.

In both figures like letters of reference are employed to designate corresponding parts.

A indicates the filter-chamber, which is or may be constructed in any ordinary or preferred form. As shown in the drawings, however, it is composed of a suitable base $a$, a body portion $b$, and a top plate $c$. Of these the base $a$ is preferably constructed in circular form and with ears $a'$ projecting from its periphery at the proper distances apart. It is provided with a depression $a^2$ and with an annular groove $a^3$, which with the depression is formed in its upper side. The body portion $b$, on the other hand, is preferably constructed in hollow cylindrical form, with its lower end resting in the groove $a^3$ in the base $a$, while the top plate $c$ is constructed in approximately the form of the base $a$ and is provided in its under side with an annular groove $c'$, in which is received the upper end of the body portion $b$. As thus constructed and arranged the body portion $b$ is held clamped between the top plate $c$ and base $a$ by tie-rods $d$, which, extending downward through suitable orifices formed in the top plate and in the ears $a'$ on the base $a$, receive appropriate nuts $d'$ on their lower ends, suitable packing $e$ of liquid-proof or insulating material, or both, being interposed between the respective lower and upper ends of the body portion $b$ and the base and top plates when required. With the filter-chamber A constructed as thus described it is or may be supported upon appropriate legs $f$ and is provided in the lower portion of the depression $a^2$ in the base $a$ with a plug $g$, which is threaded or otherwise secured in a suitable orifice formed therein and receives an inlet-pipe $h$, through which the liquid to be filtered may be discharged in the filter-chamber from the source of supply.

Located within the filter-chamber A as thus equipped is the filter B, which while capable of various modifications is here shown as composed of a cylindrical body $l$, that is made up from wire-gauze or other foraminated or reticulated material and supported at its ends upon suitable heads $l'$, with a layer or layers of felt or other appropriate filtering material $l^2$ applied to its exterior. As thus constructed this filter is preferably supported upon a vertical axis within the filter-chamber and receives the liquid supplied to the filter-chamber A upon its exterior and discharges the same after having been filtered from its interior through an appropriate discharge-pipe $i$, which leads downward from its lower end through the plug $g$ in the base $a$ and thence extends to the point of discharge. For supporting the filter B in this relationship various means may be employed. In the form of the invention which I have selected for purposes of illustration, however, it is supported upon the upper end of the discharge-pipe $i$, which extends upward in the filter-chamber a sufficient distance above the base $a$ for the purpose and enters a suitable orifice formed in the lower head $l'$ of such filter, as shown.

With the parts constructed as thus described the liquid supplied to the interior of the filter-chamber A through the inlet-pipe $h$ will rise in the filter-chamber and coming in contact with the covering of the filter will pass through the same into the interior of the filter, from which it will flow after having been thus purified through the discharge-pipe $i$ to the point of discharge. In thus passing through the filter-surface any foreign substances held in mechanical suspension in the liquid will be arrested thereby and will accumulate on the exterior surface thereof and render the filter more or less inoperative unless means are provided to prevent them from so doing. In order, therefore, to provide for the removal of these substances from the exterior of the filter-surface, I make use of cleaning devices. These cleaning devices, which may be modified in various ways, are preferably constructed in the form of a brush, with the back or support $m$ for the wires or bristles $m'$ constructed of a form to extend around the filter from approximately its upper to its lower end and with the groups of wires or bristles $m'$, disposed around its interior in parallel vertical rows, which at the proper distances apart extend from its upper to its lower end and project inward toward and against the surface of the filter. In some instances this back or support $m$ may be made integral throughout. I prefer, however, to construct it from a plurality of longitudinal sections, as thereby provision is made to take up any wear that may be occasioned to the cleaning devices, while at the same time holding those cleaning devices in yielding contact with the filter-surface. To this end I construct these sections with notched overlapping edges $m^2$, as shown in Fig. 2, and provide the adjacent edges of the adjoining pairs with projecting lugs $m^3$ through suitable orifices, in each of which pair is passed a bolt $m^4$, with a spring $m^5$ interposed between one of these lugs $m^3$ and the nut $m^6$ of the bolt, the other end of the bolt $m^6$ being provided with an appropriate head $m^7$. As thus constructed the inner ends of the groups of cleaning devices $m$ are held in contact with the surface of the filter by yielding pressure, and in order to impart the required cleaning action thereto an oscillatory back-and-forth reciprocating motion to the brush is necessary. For imparting this oscillatory motion to the brush various means may be adopted. In the drawings, however, I have shown this result accomplished from a shaft N through the intervention of a crank $n$, with which it is provided, and of a pitman $n'$, connected at one end with the wrist-pin of the crank $n$ and at the other to a suitable stud $n^2$, secured to and projecting upward from the back $l$ of the brush, as shown. As thus connected the shaft N is mounted in a suitable bearing $n^3$, secured in the top plate $c$, and is or may be rotated from a driving-shaft (not shown) through the intermediaries of two spur-gears $n^4$ and $n^5$. With the parts connected as thus explained a back-and-forth oscillatory motion may be imparted to the brush by rotating the shaft N, and to permit of this being accomplished and at the same time to insure of the brush being held in proper relationship to the filter-surface I make use of the rollers $o$, which, provided with suitable guiding-flanges $o'$ at their outer ends, are rotatively journaled in suitable bearings $o^2$, secured to and extending upward from the base $a$, and receive the lower end of the brush-back $m$, which rests thereon. By this means, as will be seen, the free and easy oscillation of the brush back and forth around the filter is permitted, the cylindrical portion of the rollers serving to support the brush upon rolling surfaces against the action of gravity and the flanges $o'$ thereon acting against the outer periphery of the back or support $m$, at the same time serving to guide the brush in a path that is concentric to the surface of the filter.

With the apparatus in operation and the liquid to be treated supplied to and passing through the filter and to the place of discharge through the discharge-pipe after having been filtered the cleaning-brush or other device will be oscillated back and forth around the filter and all particles or other foreign substance or substances will be removed from its outer surface, falling by its or their gravity down into the bottom of the filter-chamber, from which it or they may be removed when desired through a suitable opening or pipe in the plug $g$, the arrangement of the groups of wires or bristles or other cleaning devices in vertical parallel rows permitting at the same time of the various foreign substances removed from the surfaces falling down in the spaces between the rows without obstruction.

It will thus be seen from the foregoing that I produce a filter and a means for cleaning it which while possessed of great simplicity insures of the thorough and effective cleaning of the filter when in operation.

While in the drawings I have shown and in the above described the means which I prefer to employ in practice, I wish it distinctly understood that I do not limit myself strictly thereto, as it is obvious that these may be modified in various ways and still be within the scope of my invention.

Having now described my invention and specified the best means contemplated by me for carrying my invention into practice, I claim and desire to secure by Letters Patent of the United States—

1. The combination, with a filter arranged upon a vertical axis, and devices for cleaning the same arranged in concentric relationship to the filter with the points of contact of the cleaning devices therewith disposed in vertical parallel rows, of a crank, mechanism for rotating this crank, and a pitman for operatively connecting this crank with the cleaning devices, whereby a back-and-forth oscillating movement around the filter is imparted to such cleaning devices, substantially as described.

2. The combination, with a filter-chamber, and a circular filter arranged therein, of cleaning devices for the filter arranged in concentric relationship thereto, rolling surfaces upon which the cleaning devices are supported, and means by which the back-and-forth oscillation of the cleaning devices around the filter is effected, substantially as described.

3. The combination, with a filter-chamber, and a cylindrical filter arranged therein, of an annular cleaning device arranged around the filter in concentric relationship thereto, flanged rollers upon which this cleaning device is supported and guided mounted in the filter-chamber, and means by which a back-and-forth oscillatory movement may be imparted to such cleaning device, substantially as described.

4. The combination, with a filter-chamber, and a cylindrical filter arranged on a vertical axis therein, of an annular brush for cleaning the filter arranged around the same with the groups of its cleaning devices extending inward from its inner surface and disposed in vertical parallel rows, flanged rollers upon which the annular brush rests, supported from the filter-chamber, and devices by which a back-and-forth oscillatory movement may be imparted to the brush around the filter, substantially as described.

5. The combination, with a filter-chamber, and a cylindrical filter arranged on a vertical axis therein, of an annular brush for cleaning the filter made up from sections, and arranged around the filter in concentric relationship thereto, with its yielding cleaning devices extending inward from its inner surface and disposed in vertical parallel rows, flanged rollers upon which the annular brush is supported and guided supported from the filter-chamber, a shaft, and a crank and pitman by means of which the back-and-forth oscillation of the annular brush may be accomplished from such shaft, substantially as described.

In witness whereof I have hereunto set my hand this 3d day of February, 1904.

LÉON DION.

Witnesses:
  J. B. McGirr,
  R. F. Sweeny.